United States Patent
Simon et al.

(10) Patent No.: US 6,353,779 B1
(45) Date of Patent: Mar. 5, 2002

(54) METHOD FOR MANAGING COMMUNICATION MODES FOR AN AIRCRAFT

(75) Inventors: Georges Henri Simon, Wissous; Pierre Bernas, Palaiseau, both of (FR)

(73) Assignee: Thomson-CSF Sextant, Velizy Villacoublay (FR)

( * ) Notice: Subject to any disclaimer, the term of this patent is extended or adjusted under 35 U.S.C. 154(b) by 0 days.

(21) Appl. No.: 09/601,340

(22) PCT Filed: Dec. 15, 1999

(86) PCT No.: PCT/FR99/03150

§ 371 Date: Aug. 17, 2000

§ 102(e) Date: Aug. 17, 2000

(87) PCT Pub. No.: WO00/38352

PCT Pub. Date: Jun. 29, 2000

(30) Foreign Application Priority Data

Dec. 18, 1998 (FR) .......................... 98 16024

(51) Int. Cl.⁷ .................. G06F 19/00; G06G 7/76
(52) U.S. Cl. .................. 701/3; 701/120; 701/14; 340/945; 342/36; 244/1 R
(58) Field of Search .................. 701/3, 120, 14; 244/1 R; 455/73; 342/36; 340/945

(56) References Cited

U.S. PATENT DOCUMENTS

| | | | | |
|---|---|---|---|---|
| 4,642,775 A | * | 2/1987 | Cline et al. ............... 701/200 |
| 5,459,469 A | * | 10/1995 | Schuchman et al. .......... 342/37 |
| 5,761,625 A | * | 6/1998 | Honcik et al. ................. 701/14 |
| 5,798,726 A | * | 8/1998 | Schuchman et al. .......... 342/37 |
| 5,809,402 A | * | 9/1998 | Lemme ........................ 455/73 |
| 5,828,373 A | * | 10/1998 | Yves ........................... 345/333 |
| 5,920,807 A | * | 7/1999 | Lemme ........................ 455/73 |
| 6,077,077 A | * | 6/2000 | Geipe .......................... 434/30 |
| 6,173,230 B1 | * | 1/2001 | Camus et al. ............... 701/120 |

* cited by examiner

Primary Examiner—William A. Cuchlinski, Jr.
Assistant Examiner—Olga Hernandez
(74) Attorney, Agent, or Firm—Oblon, Spivak, McClelland, Maier & Neustadt P.C.

(57) ABSTRACT

The present invention relates to the management, on board an aircraft, of the aeronautical digital telecommunications networks ACARS and ATN. It covers a method for automatic choice of the transmission sub-network of the ACARS or ATN networks which is most appropriate for the exchange of digital messages with the ground, taking account of the capabilities of the equipment of the aircraft, of that existing on the ground in the area overflown, of the costs and of the reliabilities of the possible links, and of the preferences of the pilot, of his airline and of the control services. This method consists principally in the creation and updating of a database containing information: costs, performance levels, security/reliability, aircraft configuration, availabilities of the communications sub-networks as well as the stipulations by the pilot, by his airline and by the control services, and in the automatic selection of a communications mode via a sub-network of the ACARS or ATN networks, taking into account an order of preference established on the basis of criteria based on the information contained in the database (342).

4 Claims, 4 Drawing Sheets

METHOD FOR MANAGING COMMUNICATION MODES FOR AN AIRCRAFT

BACKGROUND OF THE INVENTION

1. Field of the Invention

The present invention relates to the exchanges of information between the ground and an aircraft by digital transmission. It relates more particularly to the selection of the most appropriate communications mode for establishing an air-ground and ground-air digital transmission link with an aircraft, taking account of the capabilities of the digital transmission networks existing on the ground in the area overflown by the aircraft, of the extent of the transmission facilities equipping the aircraft and of their availability as well as of the qualities and of the costs of the various communications modes possible at the instant in question.

2. Description of the Related Art

Exchanges of information in digital mode between an aircraft and the ground have the benefit of being more reliable than exchanges of phraseology in voice mode, since they do not depend on the intonation of the speaker and on the oral comprehension of a listener. It is for this reason that they are more and more being imposed in aeronautics, in supplement to or in replacement for voice-mode transmissions.

Thus an aeronautical digital communications network has existed since the 70's, in Europe and in the United States, which is known by the title ACARS (an acronym for the expression in English: "Arinc Communication Addressing and Reporting System") and which has since been extended to near-global coverage. This ACARS aeronautical digital telecommunications network is implemented throughout the world on behalf of the airlines by various operators who offer ground-ground and ground-air coverage. It uses, at the choice of the pilot of the aircraft who makes the decision on the basis of the options of the moment, either a direct air-ground and ground-air digital communications mode by VHF sub-network according to a specific protocol, a mode known as: "VDL Mode A" (VDL being the abbreviation for the expression in English: Very High Frequency Data Link), or an indirect air-ground and ground-air digital communications mode by means of a sub-network of telecommunications satellites according to another specific protocol, a mode known as: "Satcom Data 2", the protocols having been defined and standardized on the occasion of international conferences organized by the AEEC (an acronym for the expression in the English language: "Airline Electronic Engineering Committee"), which is a grouping bringing together airlines, aircraft manufacturers, equipment manufacturers and civil aviation authorities under the authority of ICAO (the International Civil Aviation Organization).

The ACARS aeronautical digital telecommunications network is very heavily used by aircraft (about 85% of the aircraft with more than 100 seats) to exchange messages with the airlines. Attempts have been made to use it in the same way for air traffic control, especially over the Pacific Ocean with the FANS-1/A ATC system (the acronym being an abbreviation of the expression in English: "Air Traffic Control, Future Air Navigation Systems), but it exhibits characteristics which do not ensure security for air traffic control functions in areas of heavy traffic. This is because it allows only exchanges of printable characters, its reliability is limited to 94% and it is not encrypted and therefore unprotected against malevolent acts.

Aware of these difficulties, ICAO has had a new, higher-performance aeronautical digital telecommunications network defined and standardized, called ATN (abbreviation of the expression in English: "Aeronautical Telecommunication Network"), which is dedicated to information exchange between an aircraft and the ground for simultaneous activities of air traffic control, called ATC, and of information exchange with the airlines, called AOC (abbreviation of the expression in English: "Aeronautical Operational Communications). This ATN aeronautical digital telecommunications network, intended to be world-wide, can employ either an indirect air-ground and ground-air digital communications mode via a sub-network of telecommunications satellites at UHF according to a specific protocol known as: "Satcom Data 3", or an air-ground and ground-air digital communications mode in line-of-sight mode, via a VHF sub-network according to another specific protocol, a mode known as "VDL Mode 2", or an air-ground and ground-air digital communications mode, also line-of-sight but via a sub-network using a secondary radar according to yet another specific protocol, a mode known as: "Mode S", or an air-ground and ground-air digital communications mode via an HF sub-network according to yet another specific protocol, a mode which is known as "HF DL" (an abbreviation of the expression in English: "High Frequency Data Link"), and which uses the reflections in the upper atmosphere so as to get round the curvature of the earth and to obtain transmission links with a range greater than line of sight, the various protocols having been defined and standardized on the occasion of conferences organized by AEEC under the authority of ICAO. The choice between the various options for air-ground and ground-air digital communications modes of these sub-networks is made on the basis of the availabilities of the moment by an automatic unit known as "router", which acts without the knowledge of the pilot of the aircraft, on the basis of a standardized routing policy.

The larger capacity and the greater reliability of the ATN network mean that it is possible to transport, on an ATN network, messages available in the format of the ACARS network by means of an ACARS onto ATN gateway system installed at a software level on board the communications computers which are carried on the aircraft and which undertake the processing of the information to be exchanged, and within the ground terminal nodes of the ATN network.

The operational deployment of the ATN aeronautical digital telecommunications network is expected to take up to about the year 2015, at which time it should completely replace the ACARS aeronautical digital telecommunications network. Meanwhile the two networks will exist jointly, obliging the pilot of an aircraft who wishes to exchange information in digital form with the ground to choose the digital transmission method used: pure ACARS, ACARS onto ATN gateway or pure ATN, on the basis of his preferences, of those of his airline, of the transmission equipment of his aircraft and of the transmission equipment available on the ground in the area overflown, the choice of the ACARS or ATN network depending on the area of coverage.

Among the parameters influencing the pilot's choice feature cost, performance and security of the communications, as well as the availability of the transmission equipment on board the aircraft and on the ground in the area overflown.

The cost of the communications is booked to the airline in the case of commercial information, or to the aviation authority (STNA in France, FAA in the USA, etc.), in the case of information relating to management of air traffic. It depends on the method of digital communications by sub-network employed for the exchanges with the ground (ATN satellite, ACARS satellite, ATN VHF radio, ACARS VHF radio, ATN HF radio, ACARS HF radio, mode-S radar transponder) and on the link on the ground between the radio-frequency receiving and sending head-end equipment and the terminal system targeted by the routers of the network.

The availability of the transmission equipment on board the aircraft depends on the physical communications facilities installed on board the aircraft, on their level of activity and on their capacity to establish a link in a given digital communications mode via a sub-network. These physical facilities consist of transmission-reception systems and of associated antennae. They are not necessarily all redundant for exchanges of information on the two aeronautical digital telecommunications networks, ATN and ACARS. It may be, for example, that the VHF and SATCOM systems are shared between the two networks, ATN and ACARS, and only usable alternately by one or other network. Neither are they all available at a given instant. For example, the pilot of an aircraft flying above an ocean far from the coasts has at his disposal only one communications mode, via a sub-network of satellites, whereas in other instances he may simultaneously use several communication modes via different sub-networks, for example a communications mode via a VHF sub-network and a communications mode via a sub-network of satellites, or even two communications modes via a VHF sub-network, one according to an ACARS protocol, the other according to an ATN protocol.

In the case which is most widespread nowadays, of an aircraft equipped to support only the ACARS aeronautical digital telecommunications network, there is a computer on board which is specialized in the management of communications according to the ACARS protocols. This computer is accessible to the pilot via a man-machine interface called: MCDU (abbreviation for the expression in English: "Multifunction Control and Display Unit"), which allows the pilot to choose between three possible operating modes: the first only allowing information exchange in digital mode according to the communications mode by VHF sub-network only, called VDL mode A, the second only according to the communications mode via a satellite sub-network called Satcom data 2, and the third either according to the communications mode via a satellite sub-network called Satcom data 2 if it is available, or, by default, according to the communications mode via a VHF sub-network called VDL mode A.

SUMMARY OF THE INVENTION

In the future, for an aircraft equipped to support the two aeronautical digital telecommunications networks ACARS and ATN, there will be one or more computers on board specialized in the management of the communications either according to the protocols of the ACARS network, or according to the protocols of the ATN network, and the pilot will have to choose the network used by means of an MCDU man-machine interface. This configuration is not optimal since it implies an additional workload for the pilot of the aircraft, who has to take care to make the correct choice of telecommunications network all along the path travelled by the aircraft. Moreover, it does not make it possible to take advantage of all the options of the two aeronautical digital transmission networks ACARS and ATN which the transmission equipment on board the aircraft and on the ground might allow. This is because, in the case of the use of the ATN network, it has to have priority of access to the on-board transmission-reception systems by reason of the security constraints imposed for the transmission of information involving air traffic control. However, there may be on-board transmission-reception systems left free or partially used by the current routing of the ATN network, either because they do not contribute to the physical link or links chosen by the routing of the ATN network, or because there is dead time between the periods of information exchange on the ATN network. When they are not engaged by the ATN network, these transmission-reception systems may be put to use to add, to a digital transmission via the ATN network, an ancillary digital transmission via the ACARS network.

The object of the present invention is to relieve the pilot of an aircraft which is equipped to support the aeronautical digital telecommunications networks ACARS and ATN of the workload of the tasks for selecting the appropriate aeronautical digital telecommunications network or networks on the basis of the capabilities of the area on the ground overflown by his aircraft, as well as to offer this pilot an automated choice of an optimal configuration of one or more communications modes via a sub-network to be allocated to the information exchanges in digital mode, this choice taking account, in addition to the capabilities of the area on the ground overflown by the aircraft, of the level of activity of the transmission equipment of the aircraft, of the transmission costs, of the performance and of the reliability of the communications modes via a sub-network which are available at every instant, of any directives from the pilot and more generally of the quality of service demanded.

The subject of the invention is a method of managing communications modes for the exchange, in digital form, of messages between the ground and an aircraft which is provided with transmission equipment suitable for the aeronautical digital tele-communications networks ACARS and ATN and for their various transmission sub-networks, and which is equipped with a computer undertaking management of the communications of the aircraft within an ACARS or ATN network, and with a man-machine interface allowing its pilot to have a dialogue with the said computer. This method consists:

in providing the said computer with a database holding, at every instant:

the updated status of the communications modes via a sub-network of the two networks ACARS and ATN recorded as being available for the aircraft at the desired moment of the exchange, taking account both of the capabilities of the transmission equipment of the ground area overflown by the aircraft and of those of the transmission equipment of the aircraft, the directives framing the choice of configuration which are expressed by the pilot by way of the man-machine interface, a pre-established routing policy, and the costs, the performance levels and qualities of service of the various communications modes via a sub-network which are offered by the two transmission networks ACARS and ATN, and in programming the said computer so as automatically to select a mode of communication via a sub-network of the ACARS or ATN transmission networks for an exchange, in digital form, of information between the aircraft and the ground, by application of a predefined rule of choice taking account of an order of preference among the various communications modes via a sub-network of the ACARS and ATN transmission networks which is established on the basis of the elements of the database: actual availabilities, at the desired moment of the exchange, of the communications modes via a sub-network for the two ACARS and ATN transmission networks, directives expressed by the pilot framing the choice of the communications mode via a sub-network to be used, pre-established routing policy, costs, performance levels and qualities of service of the various communications modes via a sub-network which are offered by the ACARS and ATN transmission networks.

Advantageously, the selection of a communications mode via a sub-network of the ACARS and ATN networks to be used for the exchange of AOC as well as ATC applications messages is made by application of a reliability criterion consisting in allocating, to the communications modes via a sub-network belonging to the ATN network, a better reliability preference mark than to the communications modes via a sub-network belonging to the ACARS network, so that the more reliable network, that is to say the ATN network, is chosen by default, the ACARS network being chosen only outside the coverage of the ATN network.

Advantageously, the selection of a communications mode via a sub-network of the ACARS and ATN networks to be used for the exchange of messages is made by application of a cost criterion consisting:

in allocating to the various communications modes via a sub-network a preference mark which is higher in inverse proportion to the overall end-to-end communications cost, in determining whether a communications mode via a sub-network belonging to the ATN network is already active at the desired moment of the exchange of messages and in consulting its cost-preference mark, in determining the communications modes via a sub-network belonging to the ACARS network, which are available at the desired moment of the exchange of messages, on the basis of the transmission equipment of the aircraft which is not used by the ATN network at that moment, and in consulting their cost-preference marks, in selecting, from among the communications modes via a sub-network which were previously adopted, the communications mode via a sub-network having the best cost-preference mark, and in recommencing the preceding operations upon each alteration to the database resulting either from the appearance of a new available communications mode via a sub-network, or from the loss of availability of a communications mode via a sub-network resulting from the movement of the aircraft or from an alteration of its flight conditions, or from a switch-over of the routing of the ATN network when the latter is active.

Advantageously, the selection of a communications mode via a sub-network of the ACARS and ATN networks for the exchange of messages is made by allocating to the various possible communications modes via a sub-network of the ATN and ACARS networks a preference mark decreasing as a function of an order of priority established on the basis of the pre-established routing policy and by selection of the communications mode via a sub-network having the highest preference mark among the communications modes via a sub-network which are available at the desired moment of the exchange of messages, taking account of the area of the ground overflown by the aircraft, of the pilot's preferences and of the availability of the transmission equipment of the aircraft.

The implementation of such a method of managing communications modes between the ground and an aircraft provided with transmission equipment suitable for the aeronautical digital telecommunications networks ACARS and ATN makes it possible to have communications via the ATN and ACARS networks existing side by side, with no additional workload for the pilot of the aircraft, by automatically choosing the configuration which is most suitable, from the point of view of the reliability, the cost or the preferences expressed by the pilot or his airline, for exchanging information with the ground, without in any way excluding a manual choice. It also makes it possible to manage conflicts of use by the ACARS and ATN networks of the on-board transmission equipment of the aircraft and thus makes it possible to have certain on-board transmission equipment of the aircraft used in common by the ACARS and ATN networks, by time-sharing, which makes it possible to reduce the amount of transmission equipment installed on board the aircraft.

BRIEF DESCRIPTION OF THE DRAWINGS

Other characteristics and advantages of the invention will emerge below from the description of an embodiment given by way of example. This description will be given with regard to the drawings in which.

DETAILED DESCRIPTION OF THE EMBODIMENTS

Figure 1:
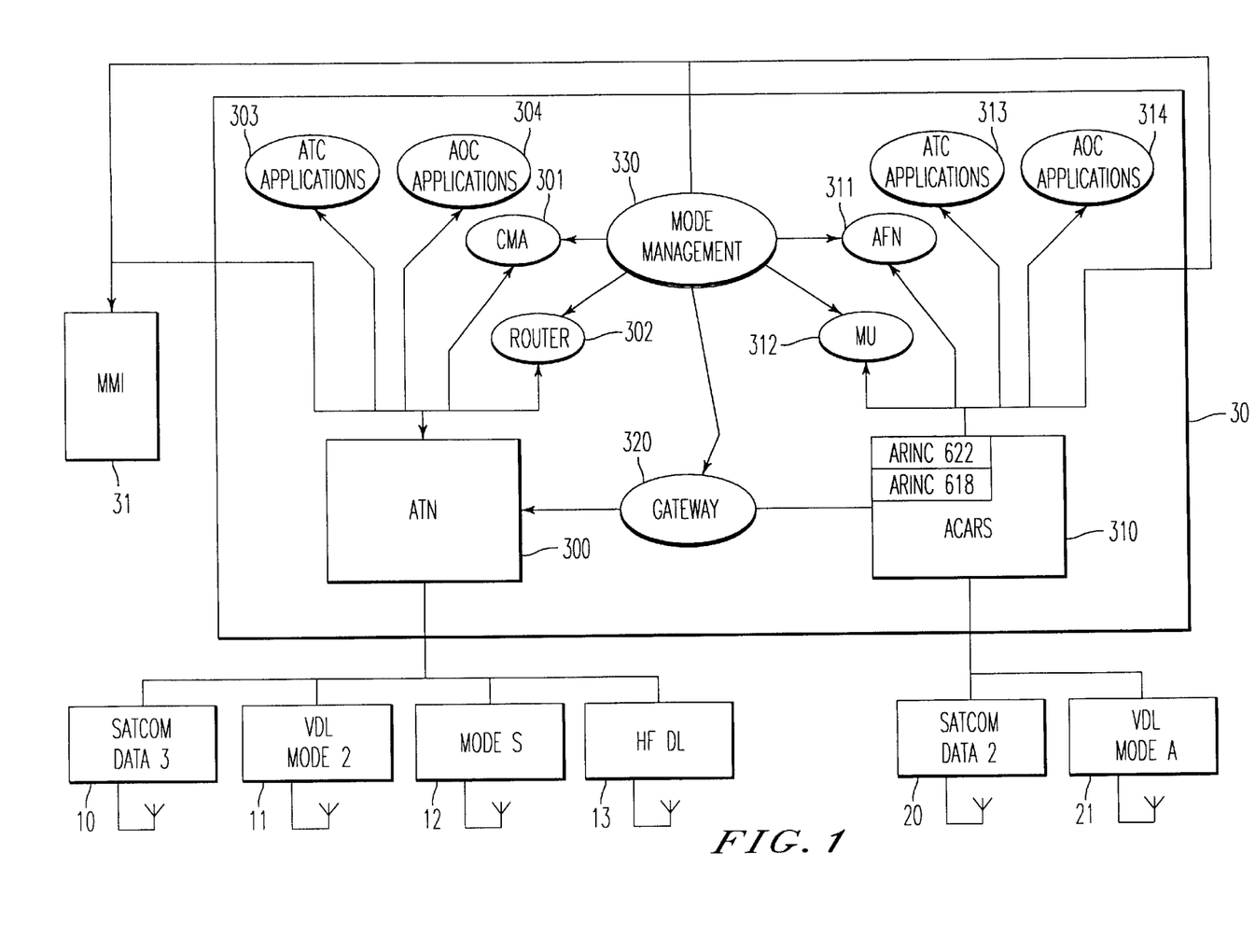
FIG. 1 diagrammatically represents the architecture of a digital transmission installation on board an aircraft, suitable for the two aeronautical digital telecommunications networks ATN and ACARS, with different transmission sub-network head ends, some of them being specific to the ATN network, the others to the ACARS network, and with a computer specialized in the management of communications providing various functions including those of driving the routing and sub-network head ends within a terminal which is common to the two aeronautical digital telecommunications networks ACARS and ATN, the specialized computer further fulfilling a priority function of management of communications modes involving the two networks and implementing a method according to the invention, FIG. 2 details the data taken into account by the communications-mode management function mentioned in FIG. 1, and FIGS. 3 and 4 represent, in flowchart form, an example of a method of selecting a communications mode via a sub-network which can be followed in order to carry out the function of managing communications modes, and which implements a method of managing communications modes according to the invention.

FIG. 1 diagrammatically illustrates one possible architecture for a digital transmission installation on board an aircraft making it possible to use the aeronautical digital telecommunications networks ATN and ACARS. This installation includes various transmitter-receiver systems, some, 10 to 13, constituting head ends for the transmission sub-networks of Satcom data 3, Mode S, VDL mode 2 and HF DL types of the ATN network, and the others 20 and 21 constituting head ends for the transmission sub-networks of Satcom data 2 and VDL Mode A types of the ACARS network.

In order to simplify the figure, it has been assumed that the transmitter-receiver systems constituting the head ends of the various transmission sub-networks were separate, but it may be that some of them are common to two transmission sub-networks. For example, the same transmitter-receiver system may serve simultaneously as a common head end for the Satcom data 2 and 3 transmission sub-networks, the transmission signals of these two sub-networks being differentiated only by their carrier frequencies. In the same way, the head ends of VDL Mode A and VDL Mode 2 transmission sub-networks may be served by a single item of transmission equipment. Clearly, in the case in which the same item of transmission equipment serves two separate transmission sub-networks, that takes place alternately, the equipment being allocated to one transmission sub-network for certain periods of time and to the other for other periods of time.

The various transmitter-receiver systems 10 to 13 and 20, 21 of the transmission sub-networks of the aeronautical digital telecommunications networks ATN and ACARS are managed by a computer 30 specialized in communications, carrying on a dialogue with the pilot of the aircraft by way of a man-machine interface 31 consisting of a terminal with a display screen and keyboard. The computer 30 furthermore handles the management of the transmitter-receiver systems of the aircraft, the insertion and the extraction of information within digital frames to the ATN or ACARS standards passing through the transmitter-receiver systems of the head ends of sub-networks, as well as the running of the various applications for information exchange with the ground which are provided for by the ACARS and ATN aeronautical telecommunications aeronautical [sic] networks. As is well known in the technology, it includes two memory stacks, one, 300, dedicated to the ATN network, the other, 310, dedicated to the ACARS network, and it is programmed by virtue of different software layers to undertake the handling of these stacks leading to the insertion and extraction of data into and from the digital frames to the ATN or ACARS standards, so as to initialize a link of ATN or ACARS type as needs be and to select a route within the chosen ATN or ACARS network, to execute various pre-loaded air traffic control or fleet management applications, as well as to exchange information with the pilot by way of the man-machine interface 31.

In FIG. 1, the main software modules featuring in the programme executed by the computer 30 are recalled in ovals. Here are found the conventional software modules specific to the ATN network or to the ACARS network, as well as a new software module (330) allowing an automatic choice between the ATN and ACARS networks, with a hybrid operating mode as appropriate.

The principal applications using the ATN network are represented in connection with the memory stack 300 dedicated to the ATN network, since they pass through the latter for data processing. An initialization software module 301, called CMA (English acronym meaning "Context Management Agent"), a routing software module 302 called "router" or IDRP, software modules 303 called "ATC Applications" consisting of pre-loaded air traffic control applications, for example, a programme for periodic communication to ground control of the position of the aircraft (ADS), and software modules 304 called "AOC Applications" consisting of pre-loaded fleet management applications, for example a crew management programme communicating the status, airborne or grounded, of the aircraft to the airline of the aircraft, are essentially distinguished.

The principal software modules specific the ACARS network are represented in connection with the memory stack 310 dedicated to the ACARS network since they pass through the latter for data processing. Here can be distinguished, as before for the ATN network, an initialization software module 311 called AFN (an abbreviation of the English term: "Air Traffic Services Facilities Notation"), which is the equivalent of the CMA software module in the case of the ACARS network, a routing software module 312 called MU (abbreviation of the English term: "Management Unit"), software modules 313 called "ATC Applications" and software modules 314 called "AOC Applications". Here, the ATC applications intended for air traffic control pass through an Arinc layer 622 added specially in order to allow transmission of information of interest to air traffic control, but the transmission obtained is much less reliable and of much lower performance than that allowed by the ATN network by reason of the more restricted capabilities of the ACARS network.

A software module 320 is also found, called "gateway", making it possible to use the ATN network as a simple communications medium for ACARS messages, this for reasons of convenience, especially the continuation of the use on the ground of data-processing devices adapted to the protocol of the ACARS network.

In addition to all these software components, a new software module 330 is found, called "Mode management", which concerns itself with the choice between the various possible networks: ATN network, ACARS network, and with the operation of the ACARS/ATN gateway, on the basis of the type of ATC or AOC message to be exchanged with the ground, of the various transmission sub-networks available and of the preferences of the pilot and of the airline. The various options covered by this choice are summarized in the table below.

| Network | Application | Sub-network |
|---|---|---|
| 1 - ATN Network | ATC | 1.1 - Satcom data 3 |
| | | 1.2 - VDL Mode 2 |
| | | 1.3 - Mode S |
| 2 - ATN Network | AOC | 2.1 - Satcom data 3 |
| | | 2.2 - VDL Mode 2 |
| | | 2.3 - HF DL |
| 3 - ACARS Network | AOC | 3.1 - Satcom data 2 |
| | | 3.2 - VDL Mode A |
| 4 - Fans 1/A Network | ATC | 4.1 - Satcom Data 2 |
| | | 4.2 - VDL Mode A |
| | | 4.3 - HF DL |
| 5 - ACARS/ATN gateway | AOC | 5.1 - Satcom data 2 |
| | | 5.2 - VDL Mode 2 |
| | | 5.3 - HF DL |

Figure 2:
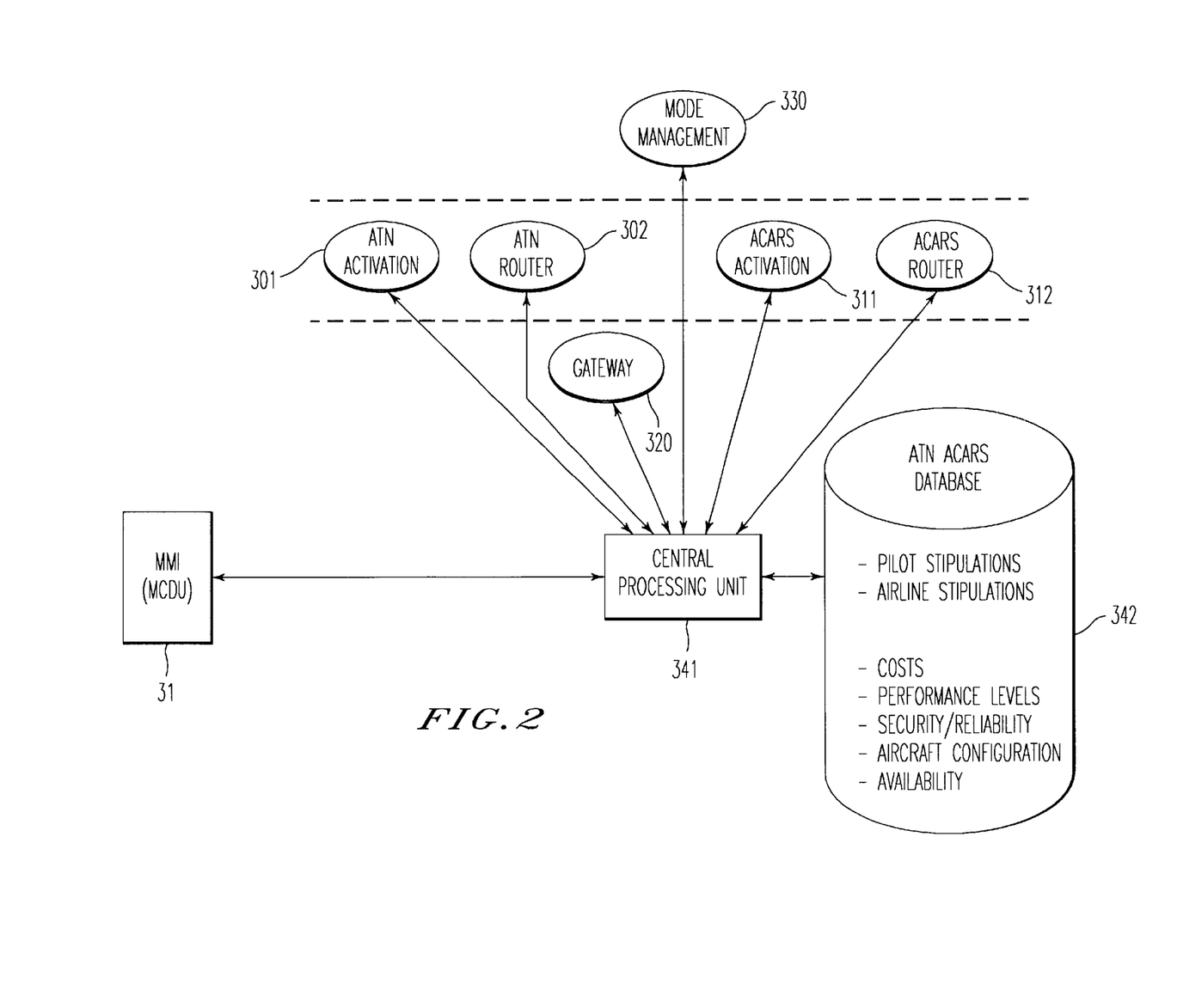

FIG. 2 more particularly details the "mode management" function added as a software overlay on the already known functions of a computer carrying out, on board an aircraft, management of an aeronautical digital telecommunications network of pure ACARS type, of pure ATN type or else of hybrid type with the use of the ATN network to transmit information in the ACARS format. For the clarity of the figure, only those elements of the computer which are directly involved with this "mode management" function have been represented, these being the central processing unit 341, its various software programming layers and a memory 342 holding an ATN-ACARS database. The man-machine interface 31 is recalled on this figure since it has a fundamental role in the exchanges of information-with the pilot.

The "mode management" function 330 regularly updates the database of the memory 342 so that the information which it contains on the transmission sub-networks is constantly up to date. It uses this information to determine the most suitable way of exchanging digital data with the ground every time this proves to be necessary and, in order to implement its choice of the moment, calls on the specific pre-existing software layers either of the ACARS network or of the ATN network, or else of the message transmission in the ACARS format via the ATN network.

For each transmission sub-network able to be employed, the database includes information on:
 the stipulations from the pilot,
 the stipulations by the airline using the aircraft,
 the costs,
 the performance aspects,
 the security/reliability,
 the aircraft configuration, that is to say the transmission sub-network head ends actually installed,
 the availability in dynamic terms.

On the basis of various criteria based on this information and on the nature, ATC or AOC, of the digital messages to be exchanged with the ground, the "mode management" function analyses the capacity of each transmission sub-network to meet the requirements of the moment and consequently allocates it an individual preference mark. It then chooses to activate the transmission sub-network having obtained the best. individual preference mark by calling, as needs be, on the software module 320 of the "gateway" function, then on the software module of the initialization function 301 or 311 of the ATN or ACARS network to which the chosen sub-network belongs, and finally on the software module 302 or 312 of the "routing" function of the network initialized which undertakes actual activation of the chosen transmission sub-network.

The individual preference mark is constructed on the basis of a summing of partial marks corresponding to the criteria based on the non-critical information, such as the cost, the performance aspects, for example, and of a product of this summing with other partial marks corresponding to criteria based on critical information, such as the aircraft configuration and the dynamic availability, for example.

In practice, the information of the database which is the most likely to vary is that relating to the availability of the transmission sub-networks because of the movement of the aircraft above regions which. are differently equipped on the ground in terms of aeronautical digital telecommunications networks and in terms of air traffic control, and of the preferences of the pilot, if appropriate. Hence, it is possible to establish, at the start of each mission by an aircraft, a pre-classification of the various transmission sub-networks taking account neither of availability nor of the preferences of the pilot, then, in the course of the mission, whenever it proves necessary to transmit or receive a digital message, to select a transmission sub-network as a function of the preferences of the pilot, of the nature, ATC or AOC, of the message to be transmitted or received, of the availability of the moment of the sub-networks and of the pre-classification adopted. The pre-classification adopted is preferably compatible with the standardized routing policy of the ATN network, so that the selection of a transmission sub-network of the ATN network via the "mode management" function may be stopped at the selection of the ATN network, the selection of the sub-network itself resulting from a call to the conventional routing software module IDRP of the ATN network.

In the event that the cost criterion prevails, that is to say where it is chosen by the pilot as being the most determining factor, the "mode management" function takes account of the reliability requirements inherent in the nature, AOC or ATC, of the message and of the actual costs by taking the hypothetical example that, under the current conditions of the marketplace, the cost of transmission of a message of the AOC type is less via the ACARS network than via the ATN network and that, more generally, the lowest cost for message transmission is obtained with a VHF transmission sub-network of VDL Mode A type of the ACARS network, transmission via a sub-network of HL DL type turning out a little more expensive, and satellite transmission via a SATCOM transmission sub-network yet more expensive:

Hypotheses

AOC/ACARS cost<AOC/ATN cost

ACARS VDL cost<SATCOM cost

Figure 3:
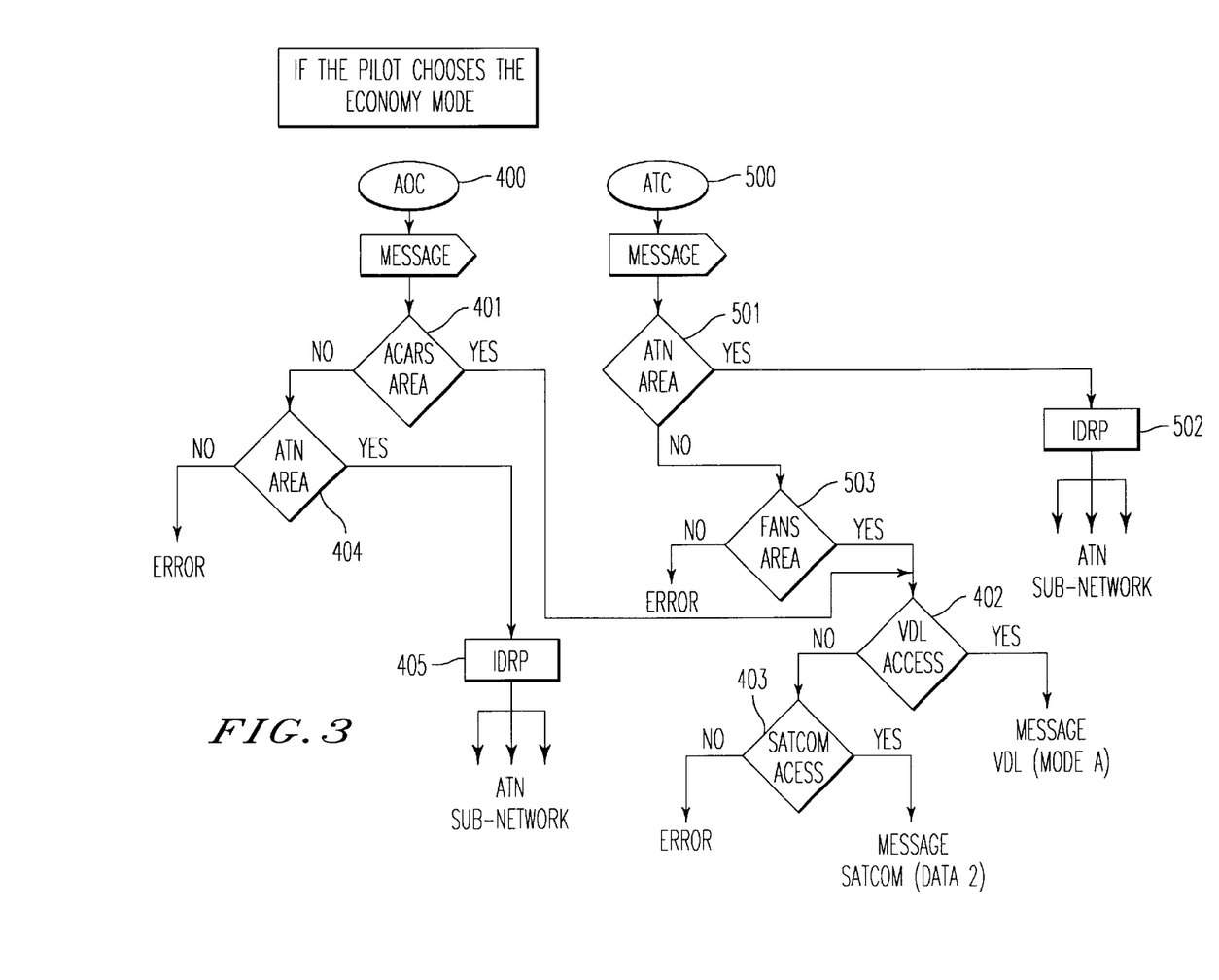

FIG. 3 is a flowchart representing the stages of the selection process which is then followed.

If the message to be exchanged with the ground is of AOC type, that is to say is of interest to the airline of the aircraft and not air traffic control (oval 400), the "mode management" function seeks preferably to use the ACARS network. It then tests, at 401, by means of the AFN function (311, FIGS. 1 and 2), whether the ACARS network is accessible in the area in which the aircraft is located. Two possible cases can arise, depending on whether the ACARS network is or is not accessible:

If the ACARS network is locally accessible, the "mode management" function first of all tests, at 402, via the routing function MU, (312, FIGS. 1 and 2), the availability of the VDL Mode A sub-network of the ACARS network. If the latter is available, it uses it to transmit the AOC-type message. If not, it proceeds at 403, still with the aid of the MU function, to a test of availability of the Satcom Data 2 sub-network of the ACARS network. If the latter is available, it uses it to transmit the AOC-type message. If not, it generates an error message since all the options relating to the transmission sub-networks of the ACARS network have been examined. This error message has the consequence of making the transmission sub-network selection process repeat from the start. Obviously, if other types of sub-networks, such as an HF DL sub- network or a SATCOM sub-network of the [sic] data 2 were brought in to equip the ACARS network, it would also be taken into account in the selection process in order of preference.

If the ACARS network is not accessible locally, the "mode management" function tests, at 404, the accessibility of the ATN network by means of the CMA function (301, FIGS. 1 and 2).

If the ATN network is accessible locally, the "mode management" function hands over to the ATN router (302, FIG. 1 and 2) which, at 405, implements the conventional process for choice of a transmission sub-network in the context of the ATN network, a process which is known by the English acronym of IDRP meaning: Inter Domain Routing Policy.

If the ATN network is not accessible locally, the "mode management" function generates an error message, since all the options have been examined and the AOC message cannot be exchanged with the ground. As before, this error message entails the selection process being repeated from the start.

If the message to be exchanged with the ground is of ATC type, that is to say of interest to air traffic control (oval 500), the "mode management" function seeks preferably to use the ATN network which is the main network for the exchanges of ATC messages. It then tests, at 501, by means of the CMA function, (301, FIG. 1 and 2), whether the ATN network is accessible in the area where the aircraft is located and whether this area has air traffic control locally available.

In the event that the ATN network is available, the "mode management" function hands over to the ATN router (302, FIG. 1 and 2) which, at 502, implements the conventional process, IDRP, for choice of a transmission sub-network in the context of the ATN network.

In the event of the ATN network being inaccessible, the "mode management" function tests, at 503, the accessibility of the ACARS network and of local air traffic control on the ground, by means of the function AFN (311, FIGS. 1 and 2), to which the ATC nature of the message has been specified. An area covered by the ACARS network and equipped with local air traffic control is called a "FANS" area.

If the ACARS network with local air traffic control is accessible, the "mode management" programme embarks on the rest of the tests 402 and 403 described above on the occasion of an exchange with the ground of an AOC message by means of the ACARS network.

If the ACCARS [sic] network with local air traffic control is not available, the "mode management" function generates an error message., as all the options have been studied and the aircraft [lacuna] momentarily outside ATC control. As before, this error message entails the selection process being repeated from the start.

In the case in which the reliability criterion prevails, that is to say when the pilot chooses to prefer the reliability of the routing of the messages, the "mode management" function takes it, as a hypothetical example, which is widely acknowledged, that the transmission reliability (trs) of the ATN network is higher than that of the ACCARS [sic] network and that, within the ACARS network, transmission (trs) via the VDL Mode A transmission sub-network is more reliable than transmission via the Satcom Data 2 transmission sub-network:

Hypotheses

ACARS reliability (trs)<ATN reliability (trs)

ACARS SATCOM reliability (trs)<ACARS VDL reliability (trs)

Figure 4:
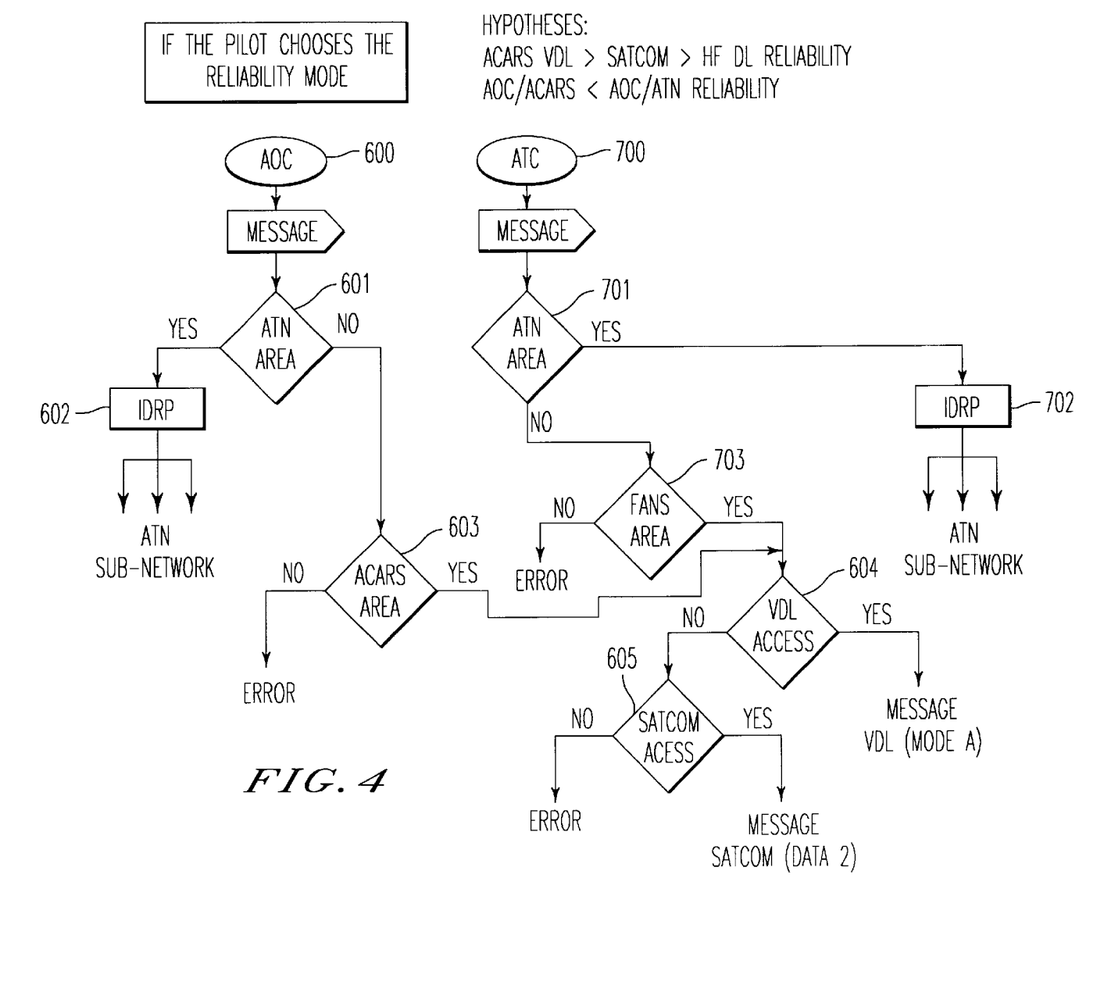

FIG. 4 is a flowchart representing the stages of the selection process which is then followed.

If the message to be exchanged with the ground is of AOC type, that is to say of interest to the airline of the aircraft and not air traffic control (oval 600), the "mode management" function seeks preferably to use the ATN network. It then tests, at 601, by means of the CMA function (301, FIGS. 1 and 2), whether the ATN network is accessible in the area in which the aircraft is located. Two possible cases can arise depending on whether the ATN network is or is not accessible:

In the event that the ATN network is accessible, the "mode management" function hands over to the ATN router (302, FIG. 1 and 2), which, at 602, implements the conventional process, IDRP, for choice of transmission sub-network in the context of the ATN network.

If the ATN network is not accessible locally, the "mode management" function tests, at 603, the accessibility of the ACARS network by means of the AFN function (311, FIGS. 1 and 2).

If the ACARS network is accessible locally, the "mode management" function first of all tests, at 604, via the routing function MU (312, FIGS. 1 and 2), the availability of the VDL Mode A sub-network of the ACARS network. If the latter is available, it uses it to transmit the AOC-type message. If not, it proceeds, at 605, still with the aid of the routing function MU, to a test of availability of the Satcom Data 2 sub-network of the ACARS network. If the latter is available, it uses. it to transmit the AOC-type message. If not, it generates an error message since all the options relating to the transmission sub-networks of the ACARS network have been examined. This error message has the consequence of making the transmission sub-network selection process repeat from the start.

If the message to be exchanged with the ground is of ATC type, that is to say of interest to air traffic control (oval 700), the "mode management" function seeks preferably to use the ATN network. It then tests, at 701, by means of the CMA function (301, FIG. 1 and 2), whether the ATN network is accessible in the area in which the aircraft is located.

In the event that the ATN network is accessible, the "mode management" function hands over to the ATN router (302, FIG. 1 and 2) which, at 702, implements the process IDRP for choice of a transmission sub-network in the context of the ATN network.

In the event that the ATN network is inaccessible, the "mode management" function tests, at 703, for the presence of a "Fans" area, that is to say an area accessible via the ACARS network and equipped with air traffic control on the ground, by means of the function AFN (311, FIGS. 1 and 2) to which the ATC nature of the message has been specified.

If the ACARS network with local air traffic control is accessible, the "mode management" programme embarks on the rest of the tests 604 and 605 described above on the occasion of an exchange with the ground of an AOC message by means of the ACARS network.

If the ACARS network with local air traffic control is not available, the "mode management" function generates an error message since all the options have been examined. As before, this error message entails the selection process being repeated from the start.

The implementation of the method of managing communications modes for aircraft which has just been described allows an automatic choice, with no intervention by the pilot, between the aeronautical digital telecommunications networks ACARS or ATN and, within these networks, of the transmission sub-network which is best suited to the conditions of the moment, having regard to the preferences expressed by the pilot and his airline.

What is claimed is:

1. Method of managing communications modes for an exchange, in digital form, of messages between the ground and an aircraft provided with transmission equipment suitable for aeronautical digital telecommunications with ACARS and ATN networks and transmission sub-networks of said ACARS and ATN networks, said aircraft equipped with a computer managing communications of the aircraft within the ACARS and ATN networks, said computer equipped with a man-machine interface allowing a pilot to dialogue with said computer, said method comprising the steps of:

provid­ing said computer with a database including,
an updated status of the communications modes via one of the transmission sub-networks of the ACARS and ATN networks available to the aircraft at a desired moment of said exchange of messages, said updated status taking in account capabilities of the transmission equipment on a ground area overflown by the aircraft and said transmission equipment of the aircraft,
directives expressed by the pilot by way of said man-machine interface and framing a configuration choice of said communications modes,
a pre-established routing policy, and
costs, performance levels, and qualities of service of said communications modes; and selecting, via the computer, one of the communication modes via said one of the transmission sub-networks by application of a predefined rule accounting for an order of preference among said communications modes via one of said transmission sub-networks, a selected transmission sub-network established on a basis of elements of said database, including,     actual availabilities, at the desired moment of the exchange, of the communications modes via one of said transmission sub-networks,     directives expressed by the pilot and framing a communications choice of a communications mode via one of said transmission sub-networks to be used,     pre-established routing policy, costs, performance levels, and qualities of service of said communications modes, offered by said ACARS and ATN transmission networks via one of said transmission sub-networks.

2. Method according to claim 1, wherein the selecting step comprises:

selecting one of the communications modes to be used for the exchange of messages via one of said transmission sub-networks by application of a reliability criterion including,     allocating to ATN communications modes via a sub-network belonging to the ATN network a better reliability preference mark than to ACARS communications modes via a sub-network belonging to the ACARS network,     wherein the ACARS network is chosen outside a coverage of the ATN network.

3. Method according to claim 1, wherein the selecting step comprises:

selecting one of the communications modes to be used for the exchange of messages via one of said transmission sub-networks by application of a cost criterion, including,         allocating to said communications modes via one of said transmission sub-networks a preference mark which is in inverse proportion to the communications cost,         determining whether an ATN communications mode via an ATN sub-network belonging to the ATN network is active at the desired moment of said exchange of messages and consulting a cost-preference mark of said ATN communications mode,     determining which of said communications modes, via an ACARS sub-network belonging to the ACARS network, are available at the desired moment of said exchange of messages on a basis of both transmission equipment on the aircraft not used at the moment by the ATN network and cost-preference marks of the communications modes,     selecting from among said communications modes via a previously adopted sub-network a communications mode having the best cost-preference mark, and     recommencing the steps of allocating, determining, and selecting upon each alteration to the database resulting either from an appearance of a new available communications mode, or from a loss of availability of a communications mode resulting from a movement of the aircraft, or from an alteration of flight conditions, or from a switch-over of a routing of the ATN network when the ATN network is active.

4. Method according to claim 1, wherein the selecting step comprises:

selecting one of the communications modes via one of the transmission sub-networks, including,         allocating to the communications modes via one of the transmission subnetworks a preference mark decreasing as a function of an order of priority established on a basis of a pre-established routing policy, and         selecting one of the communications modes via a sub-network having the highest preference mark among the communications modes which are available at the desired moment of said exchange of messages, taking account of an area of a ground overflown by the aircraft, a pilot's preferences, and an availability of the transmission equipment of the aircraft.

* * * * *